(No Model.)

J. D. DORSEY.
VEHICLE SPRING.

No. 297,974. Patented May 6, 1884.

WITNESSES
J. P. Murray
Luther Rees.

INVENTOR
John D. Dorsey
By Charles E. Postley
Atty.

UNITED STATES PATENT OFFICE.

JOHN D. DORSEY, OF GREENVILLE, ILLINOIS.

VEHICLE-SPRING.

SPECIFICATION forming part of Letters Patent No. 297,974, dated May 6, 1884.

Application filed January 24, 1884. (No model.)

*To all whom it may concern:*

Be it known that I, JOHN D. DORSEY, a citizen of the United States, residing at Greenville, in the county of Bond and State of Illinois, have invented certain new and useful Improvements in Carriage and Wagon Springs; and I do hereby declare the following to be a full, clear, and exact description of the invention, such as will enable others skilled in the art to which it appertains to make and use the same.

My invention relates to the construction of side-bar vehicles; and it consists, chiefly, of such a vehicle having the body connected to the side bars by springs which are flat curved and coiled at one extremity, composed of one or more leaves. Each spring is formed of two half-springs joined together at their curved extremities by a link, while the coiled portions encircle the side bars and are suitably attached thereto; and it further consists of other connecting parts with the body of the vehicle, and combinations more specifically hereinafter set forth in the claims. The springs heretofore used for this purpose have been made either very stiff, in order to have sufficient strength to sustain a heavy load, and consequently yielded but little to a light load, and when these springs were depressed by a heavy load they were so stout and stiff as to push out the side bars, thereby racking the gear and producing rapid wear; or, if made light, they broke down completely under an unusually heavy load, and likewise caused rapid destruction of the parts.

The object of my invention is therefore to provide such a spring as will fully meet all the requirements of both stiff and light spring, as desired, and at the same time preserve the gear of the vehicle from being racked and strained, whether the load be large or small.

To enable others skilled in the art to which my invention appertains to make and use the same, I will now more specifically describe it by reference to the accompanying drawings, forming a part of this specification, in which—

Figure 1:
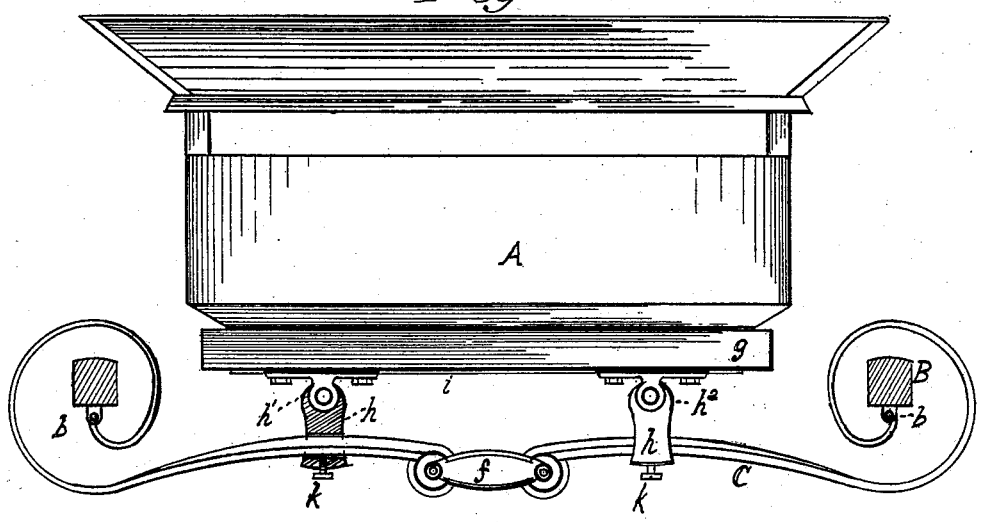
Figure 2:
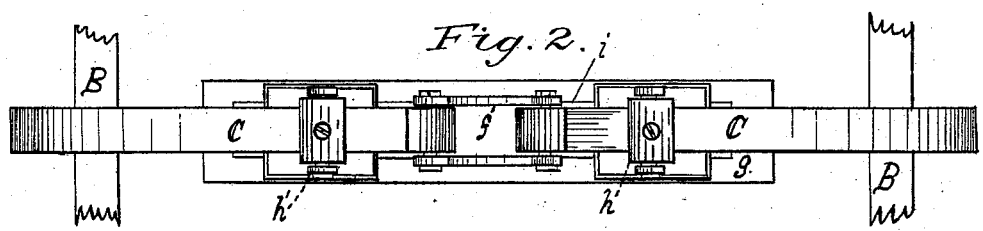
Figure 3:
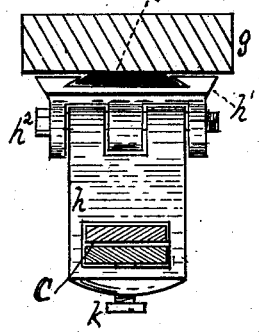

Figure 1 is an edge view of the spring, together with an end view of the body and side bars of a vehicle, showing my improvements connected therewith. Fig. 2 represents the spring as viewed from below and connected to the side bars and a cross-bar on bottom of vehicle. Fig. 3 is an enlarged detail view of the coupling device forming part of my invention.

Like letters of reference indicate like parts in each of the figures.

The body A is of any desired form, and is placed in a rectangular frame consisting of side bars, B, which may also be supported by a semi-elliptical spring and the front bolster and rear axle. The springs C, which first encircle the side bars, as represented in Fig. 1, are fastened thereto by suitable shackles, $b$. These springs are single, flat, and of uniform thickness throughout their coiled portions, but are curved, and may consist of one or more leaves between that part and the point of connection with the link $f$, by which they are joined together, as shown. The body of the vehicle rests on a cross-bar, $g$, and to the under side of this bar $g$ are attached, at one end, the couplings $h$ by means of hinge-brackets $h'$, which are joined to and may be moved freely in guide $i$, bolted or otherwise suitably secured to bar $g$ and the body of the vehicle. The brackets $h'$ can be moved laterally beneath the body of the vehicle in the guide $i$, and rigidly fixed in any desired point by means of either a set-screw or bolts, which may pass through the guide-plate and bar for additional security and strength. To these brackets $h'$ the couplings $h$ are hinged by means of bolts at the upper end, while through a slot in the lower ends the curved parts of the springs pass, and thereby sustain the weight of the body of the vehicle. The lower ends of the couplings $h$ are securely fixed at any desired point on the curved portion of the spring by means of the set-screws $k$, or may be otherwise firmly attached and accomplish the same results.

From the foregoing description of the parts and connections of my invention it will be readily understood that the couplings $h$ and their hinged bearing may be brought either close together or separated more than as represented in Fig. 1 of the drawings, and the springs be thereby rendered quite flexible and yielding, or firm and capable of sustaining a great weight without injury either to them or the gear and side bars of the vehicle; also, by reason of the body of the vehicle having a hinged connection with the springs, an easy long swaying motion will be imparted to the same, instead of the short, quick, jerky movements commonly experienced with ordinary springs when the vehicle is in rapid motion over an uneven road.

Having thus described my invention, what I claim as new, and desire to secure by Letters Patent, is—

1. A vehicle-spring composed of half-springs joined by a link at one end, and having the other extremities attached to the side bars, around which they form a coiled spring, prior to being connected therewith, in combination with laterally-adjustable couplings or connections with the body of the vehicle, substantially as shown, and for the purpose hereinbefore set forth.

2. In combination with the body and springs of a vehicle, a coupling device connecting them susceptible of a swinging movement and lateral adjustment on both the body and springs of said vehicle, substantially as and for the purpose set forth.

3. A coupling device between the body and springs of a vehicle, by which the said body is supported on said springs, the said coupling device having a lateral adjustment, substantially as shown and described, and being provided with a set-screw or other suitable contrivance by means of which it is secured in position on the springs.

4. The combination of guide $i$, brackets $h'$, couplings $h$, and the springs of a side-bar vehicle, with which said couplings $h$ are adjustably connected, substantially as and for the purpose specified.

In testimony whereof I have affixed my signature in presence of two witnesses.

JOHN D. DORSEY.

Witnesses:
GEORGE H. FELLETT,
ABRAM JARRARD.